(12) United States Patent
    Reusch

(10) Patent No.: US 11,970,887 B2
(45) Date of Patent: Apr. 30, 2024

(54) LOCK COMPRISING A CLOSING DEVICE FOR A MOTOR VEHICLE

(71) Applicant: Kiekert AG, Heiligenhaus (DE)

(72) Inventor: Manuel Reusch, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 580 days.

(21) Appl. No.: 17/256,086

(22) PCT Filed: Jun. 27, 2019

(86) PCT No.: PCT/DE2019/100600
§ 371 (c)(1),
(2) Date: Dec. 24, 2020

(87) PCT Pub. No.: WO2020/007409
PCT Pub. Date: Jan. 9, 2020

(65) Prior Publication Data
US 2021/0270065 A1    Sep. 2, 2021

(30) Foreign Application Priority Data
Jul. 5, 2018 (DE) .................... 10 2018 116 285.5

(51) Int. Cl.
*E05B 81/62*    (2014.01)
*E05B 81/06*    (2014.01)
(Continued)

(52) U.S. Cl.
CPC .............. *E05B 81/62* (2013.01); *E05B 81/06* (2013.01); *E05B 81/16* (2013.01); *E05B 81/20* (2013.01);
(Continued)

(58) Field of Classification Search
CPC ................................ E05B 85/26; E05B 79/20
See application file for complete search history.

(56) References Cited

U.S. PATENT DOCUMENTS

| 4,498,049 A * | 2/1985 | Rudek | G01N 27/417 |
| | | | 324/443 |
| 2004/0045330 A1 * | 3/2004 | Moon | E05B 47/0673 |
| | | | 70/107 |

(Continued)

FOREIGN PATENT DOCUMENTS

| DE | 10140365 A1 | 3/2003 |
| DE | 19828040 B4 | 5/2005 |

(Continued)

OTHER PUBLICATIONS

Computer Generated Translation for WO 2011065226 A1, Generated on May 16, 2023, https://worldwide.espacenet.com/ (Year: 2023).*

(Continued)

*Primary Examiner* — Alyson M Merlino
(74) *Attorney, Agent, or Firm* — Renner, Otto, Boisselle & Sklar, LLP

(57) ABSTRACT

A lock for a motor vehicle includes a locking mechanism consisting of a rotary latch and at least one pawl, a closing device having an electric drive, wherein the locking mechanism can be transferred from a pre-locking position into a main locking position by the closing device, and a control unit for the closing drive, wherein a closing operation can be prevented in accordance with a measurement variable of the closing drive, and wherein the closing operation can be prevented in accordance with a determinable deviation from a setpoint value curve.

19 Claims, 2 Drawing Sheets

(51) Int. Cl.
    *E05B 81/16*     (2014.01)
    *E05B 81/20*     (2014.01)
    *E05B 81/30*     (2014.01)
    *E05B 81/66*     (2014.01)
    *E05B 81/74*     (2014.01)
    *E05B 85/26*     (2014.01)
    *E05B 79/20*     (2014.01)

(52) U.S. Cl.
    CPC .............. *E05B 81/21* (2013.01); *E05B 81/30* (2013.01); *E05B 81/66* (2013.01); *E05B 81/74* (2013.01); *E05B 85/26* (2013.01); *E05B 79/20* (2013.01)

(56) References Cited

U.S. PATENT DOCUMENTS

| | | | | |
|---|---|---|---|---|
| 2018/0058116 A1* | 3/2018 | Erices | .................. | E05B 81/20 |
| 2018/0187463 A1* | 7/2018 | Schmidt | .................. | E05B 85/26 |

FOREIGN PATENT DOCUMENTS

| | | | | | |
|---|---|---|---|---|---|
| DE | 202013004785 U1 | * | 10/2014 | ............. | E05B 81/20 |
| DE | 202014103819 U1 | * | 12/2015 | ............. | E05B 81/20 |
| DE | 102015005963 A1 | * | 2/2016 | ............. | E05B 81/64 |
| DE | 102016121083 A1 | | 5/2018 | | |
| DE | 102017101704 A1 | | 8/2018 | | |
| EP | 2803795 A2 | * | 11/2014 | ............. | E05B 81/20 |
| WO | 2011065226 A1 | | 6/2011 | | |

OTHER PUBLICATIONS

Computer Generated Translation for DE 102015005963 A1, Generated on May 16, 2023, https://worldwide.espacenet.com/ (Year: 2023).*

Translation of International Search Report dated Sep. 18, 2019, for International Patent Application No. PCT/DE2019/100600.

* cited by examiner

LOCK COMPRISING A CLOSING DEVICE FOR A MOTOR VEHICLE

FIELD OF INVENTION

The invention relates to a lock for a motor vehicle, said lock comprising: a locking mechanism consisting of a rotary latch and at least one pawl; a closing device having an electric drive, wherein the locking mechanism can be transferred from an opening position, in particular a pre-locking position, into at least one main locking position by means of the closing device; and a control unit for the closing drive, wherein a closing operation can be prevented in accordance with a measurement variable of the closing drive, wherein the closing operation can be prevented.

BACKGROUND OF INVENTION

More and more comfort functions are being integrated into today's motor vehicles in order to allow the motor vehicle to be operated as simply as possible. For example, it is known that motor vehicle doors, flaps, or hoods are closed by means of a closing device. On the one hand, this can be due to the fact that the door should be able to close easily and, on the other hand, it can be due to the fact that, for example, an outside door handle should be dispensed with in order to achieve a corresponding design or to simplify operation in that the door is designed so as to be independently lockable. Such closing devices are often used, particularly in fully automatic tailgates. These flaps can, for example, only be operated with a radio remote control, without manual actuation of the flap itself.

For example, DE 101 40 365 A1 relates to a servo lock holder for a motor vehicle door lock, the term "servo lock holder" being used for a lock holder in which an automatic closing takes place. A locking bolt of the motor vehicle door lock is attached to an adjustable actuating oscillator. A drive for the actuating oscillator is also provided. The drive moves the actuating oscillator with the locking bolt and a rotary latch encompassing the locking bolt and consequently an associated door from a pre-locking position into a main locking position. An additional locking lever ensures that the actuating oscillator is held in this position when the door is manually transferred from the pre-locking position to the main locking position.

Such lock holders provided with a closing device are used in principle for all conceivable doors on a motor vehicle. For example, an action is not only conceivable for side doors, but also for trunk flaps, tailgates, or engine hoods and is included within the scope of the invention. With the help of the closing device implemented in this way, the door or vehicle door affected can now be shifted from the previously mentioned pre-locking position into the main locking position against the resistance of a seal, for example.

Another structural design of a closing device is the subject matter of DE 198 28 040 B4. The document relates to a power-assisted closing device for doors, flaps, tops, or roofs of motor vehicles and in particular passenger cars, in which a pivotable stop element is arranged on a rotary latch. In addition, the pawl interacting with the rotary latch also has a pivotable stop element. The two stop elements interact with a control disk during the opening or closing operation. The control disk is part of an actuator, with the help of which both an opening and a closing operation can be effected.

Unpublished document DE 10 2017 101 704.6 discloses a lock for a motor vehicle having a locking mechanism comprising a rotary latch and a pawl, a closing device and an electric drive, the closing being carried out at least in some regions by means of a force closure. The closing device acts directly on the rotary latch and transfers the rotary latch from a pre-locking position into a main locking position. A sensor arranged on the rotary latch detects at least one position of the rotary latch and preferably the main locking position, so that closing can be ended or stopped.

It can also be seen from the disclosure that the force exerted when closing is monitored. Monitoring the expenditure of force takes place in this case by means of a detection of the increase in current, the increase in current being detectable as a measure of the proper sequence of the closing operation and being usable as a control means. A malfunction or jamming is detected by means of an excessively high current, so that an interruption, disengagement of the closing drive, and/or reversing of the closing drive can be initiated.

DE 10 2018 106 016.5, which is also unpublished, discloses a motor vehicle drive arrangement having a drive member and an abutment, furthermore having at least one spring between the drive member and the abutment, and having at least one drive sensor which, in accordance with the application of force to the drive member against the force of the spring and an associated relative movement between the drive member and the abutment, transmits a sensor signal to a control unit. By means of the drive member sensor, in accordance with the application of force to the drive member, a force-dependent sensor signal is generated which is evaluated by the control unit to control an actuator.

The known prior art shows possible solutions for controlling a closing operation, but overall is in need of improvement. In particular, strong fluctuations can occur in relation to individual requirements for the closing drive, so that controlling the closing operation cannot be directly adapted to the individual requirements in the motor vehicle lock. This is the starting point for the invention.

SUMMARY OF INVENTION

The object of the invention is to provide an improved lock for a motor vehicle with a closing device. In particular, it is the object of the invention to provide a lock for a motor vehicle with a closing device that can be adapted to the individual requirements of a lock, preferably providing the most realistic possible way of detecting a deviation in a control variable. In addition, it is an object of the invention to provide a structurally favorable and cost-saving solution.

It should be noted that the embodiments described below are not restrictive; rather, any variation possibilities of the features described in the description are possible.

The object of the invention is achieved in that a lock for a motor vehicle is provided comprising a locking mechanism consisting of a rotary latch and at least one pawl; a closing device having an electric drive, wherein the locking mechanism can be transferred from an opening position, in particular a pre-locking position, into at least one main locking position by means of the closing device; and a control unit for the closing drive, wherein a closing operation can be prevented in accordance with a measurement variable of the closing drive, and wherein the closing operation can be prevented in accordance with a determinable deviation from a setpoint value curve. The design of the motor vehicle lock according to the invention now creates the possibility of providing control of the closing operation that is adapted to the real loads in the motor vehicle. In particular, a setpoint value curve tailored to the motor vehicle, which, for example, by calibrating the lock in relation to the actual loads present in the motor vehicle, a setpoint value curve can be stored in the control unit so that a reference value for calculating or determining a deviation from the setpoint curve can be provided.

The closing operation can then be controlled in accordance with the definable or specifiable deviation from the setpoint value curve. If the measurement variable deviates beyond the determinable deviation of the setpoint value curve from the setpoint value curve, the closing operation can be interrupted. A deviation can occur, for example, when a motor vehicle side door, for example, is pulled shut and an object gets between the door and the frame of the motor vehicle. In this case, the closing operation can be interrupted or the closing operation can be reversed. By preventing the closing operation according to the invention and, in particular, by defining a deviation from the setpoint value curve, control of the closing operation with the highest level of operational reliability can be provided.

Various locks and actuating elements can be used as a lock for a motor vehicle. The lock can be used as a compact unit, for example in a side door, sliding door, or in the region of flaps or lids or covers. That applies to wherever pivotably or displaceably arranged components have to be secured on the motor vehicle in order to operate the motor vehicle. In addition, it is also conceivable that, for example, hood locks, auxiliary locks such as for example in transporters, are used in combination with a closing device.

A locking mechanism in a motor vehicle lock according to the invention has a rotary latch and at least one locking pawl, the rotary latch being lockable in a locking position by means of the locking pawl. Two-stage locking mechanisms consisting of a pre-locking device and a main locking device as well as systems with one or two locking pawls are used. A release lever acts on the locking mechanism, wherein the release lever, for example, by means of a pivoting movement which brings one or more pawls out of engagement with the rotary latch. The release lever is preferably pivotably mounted in the motor vehicle lock and preferably in a housing and/or a lock case of the motor vehicle lock together with the locking mechanism.

The closing device has an electric motor drive and can be arranged directly in the lock or interact directly or indirectly with the rotary latch as a separate module, for example by means of a Bowden cable or a lever system. This means that, for example, an electric motor drive with a corresponding gear is designed as a separate module and the separate module is connected to a lock housing of the lock, for example by means of a Bowden cable. The Bowden cable core can then, for example, be connected to a closing pawl, the closing pawl acting directly on the rotary latch. The closing pawl is then pivotably arranged in the lock, specifically in such a way that the closing pawl can be brought into engagement with the rotary latch via the closing path.

It is also conceivable, however, that the closing device is integrated directly on the lock or even in the lock; it is, for example, conceivable that the electric drive and, for example, a torque converter, for example in the form of a gear, are directly connected to the rotary latch. For this purpose, for example, an electric motor can interact with a spindle drive, the spindle drive moving the closing pawl. In this case, the closing pawl can be arranged so as to be pivotable in the lock such that the closing pawl can be brought into engagement with the rotary latch via the closing path. With the help of the electric drive, the closing device moves the locking mechanism from an opening position into a main locking position. The locking mechanism is preferably transferred from a pre-locking position into an overtravel position, so that it is possible for the locking pawl to fall safely into the main locking position of the rotary latch.

A control unit is connected to the electric drive of the closing device and is at the same time connected to at least one sensor, for example a microswitch or Hall sensor. A rotary movement of the rotary latch, a position of the locking mechanism, and/or a position of the closing device can be detected by means of the sensor. In accordance with at least one measurement variable of the closing drive, the control unit can influence the closing operation. In particular when the main locking position or an overtravel position is reached, the control unit controls the electric drive in such a way that further tightening is prevented or reversing of the drive is initiated. A measurement variable can be a sensor signal; but a power consumption of the electric drive, a speed of the electric drive, and/or a voltage curve, for example of a Hall sensor of one of the closing devices, can also serve as the measurement variable. In accordance with the measurement variable and in particular using a deviation from the setpoint value curve that is determinable in the controller, the measurement variable can then be used to control the closing operation. In particular, in the event of a measurement variable difference, the closing operation can be prevented or the closing operation can be canceled by means of the control unit. The measurement variable difference is therefore a measure for controlling the closing operation.

In one embodiment of the invention, a setpoint value curve for a speed and/or a power consumption of the electric drive is contained, in particular stored, in the control unit. A setpoint value curve is determinable, for example, by calibrating the motor vehicle lock in relation to the real requirements when using the lock in the motor vehicle.

This setpoint value curve can be stored in the control unit for a speed of the electric motor of the electric drive and/or for a current consumption of the motor of the electric drive. This setpoint value curve then forms the measure or the basis for determining the deviation. The power consumption of the motor can be detected directly by the control unit since the control unit provides the power for operating the electric drive. The speed of the motor can be detected, for example, by means of a rotary encoder, so that the deviation is determinable directly in the control unit. The rotary encoder can for example be arranged directly on the motor and be in connection with the control unit. The setpoint value curve is not to be understood directly as a line, but can have a spread or, for example, a current fluctuation during the closing. What is substantial for this purpose, however, is that the deviation deviates significantly from the setpoint value curve, with the measurement variable difference being adaptable to a switching threshold, with an interruption of the closing operation when a switching threshold is reached. In particular, if an object is jammed in, for example, a flap opening, the speed can decrease so that a switching threshold for a speed is reached, which in turn serves as a measure or measurement variable for interrupting the closing operation.

In a further embodiment variant of the invention, there is an advantage if the closing device has a drive member, in particular a Bowden cable, and an abutment, having at least one spring between the drive member and the abutment and a drive member sensor, wherein, by means of the drive member sensor, an application of force to the drive member, in particular a voltage, can be detected. This embodiment makes it clear that it is not only the measurement variables that can be detected directly on the electric drive that can be used to control the closing operation. Rather, it is also conceivable that a voltage detection in a drive member assigned to the closing device can be used to detect a deviation in a measurement variable. A drive member can act as disclosed in DE 10 2018 106 046.5, the disclosure content of this publication being hereby declared to be the disclosure content of the present invention. A setpoint value curve can also be determined and stored for the voltage curve on the drive member, so that a closing operation can be reversed in the event of a deviation from the setpoint value curve. The invention is thus based on the fact that a setpoint value curve is determinable in accordance with a setpoint value curve or a detected measurement variable for an ideal closing operation and can be stored as a reference curve in the control unit.

If the closing operation can be prevented in accordance with a current difference and/or a speed difference and/or a voltage difference as a deviation from the setpoint value curve, this results in an advantageous embodiment variant of the invention. In accordance with the setpoint value curve and, for example, a setpoint value curve of the current curve during the closing operation, a switching threshold is determinable for which, when reached, the deviation from the setpoint value curve is so large that an irregular closing operation can be assumed. This can be caused in particular by jamming or damage to, for example, a door or flap that is to be closed. The evaluation according to the invention of the deviation, for example the current or speed difference, thus achieves the highest level of operational reliability, so that jamming can be prevented even when the motor vehicle door is closed fully automatically.

If a rotary latch sensor is provided, wherein a closed position of the rotary latch is determinable by means of the rotary latch sensor, a further variant embodiment of the invention results. A rotary latch sensor can also be used to detect the exact position of the rotary latch. This can be advantageous, in particular, for jamming, since jamming or a risk of injury to an operator can only be ruled out when there is a very small gap in the door, for example, which is closed by the closing drive. In particular, an anti-jamming protection can be activated or deactivated in accordance with the signal from the rotary latch sensor. In particular, if, for example, the opening position of the locking mechanism is located before the pre-locking position, i.e. the rotary latch is already moved by means of the closing drive before the pre-locking position is reached, the activation or deactivation of the anti-jamming protection in accordance with the rotary latch sensor can be advantageous. In particular, when the components of the motor vehicle to be closed are reached, very high sealing forces can occur, which can also deviate from the real or ideal values of the closing operation in accordance with the weather conditions. For example, at very low temperatures the seal can offer greater resistance, so that higher sealing forces have to be overcome. Thus, by means of the rotary latch sensor, a point in time or a position of the rotary latch is determinable after which an anti-jamming protection can be deactivated, with a high probability of jamming and/or injuring an operator being excluded from this point in time. In particular, the signal from the rotary latch sensor can be generated at a point in time when the closing operation has almost ended. For example, a door gap of less than 3 millimeters can also serve as a measure for deactivating the anti-jamming protection.

In a further embodiment of the invention, if a current, speed, and/or voltage difference is detected as a deviation from the setpoint value curve, switching off of the current and/or voltage supply of the closing device or reversing of the closing device takes place. Depending on the design of the closing device, which can have a self-locking gear, for example, reversing the closing device can be advantageous in order to be able to open the door or flap again in the case of jamming. Switching off the voltage and/or power supply can be advantageous if the closing device automatically disengages from the rotary latch after the power supply has ceased, for example.

In an advantageous manner, at least one switching means can be provided for determining an opening position and/or a pre-locking position and/or a main locking position, and/or an overtravel position. The arrangement of one or more switching means can provide additional security during the closing operation. In particular, the positions of the locking mechanism are precisely determinable, so that a very precise detection of a setpoint value curve and thus precise control of the closing device is possible. An opening position can, for example, as described in DE 10 2017 101 704.6, already exist well before a locking position, namely when, for example, the closing operation is only initiated with a force fit and only changes into a form fit after a pre-locking position has been reached. As a result of the combination, the setpoint value curve can advantageously be matched precisely to the closing operation by means of the switching means.

The switching means can advantageously be a microswitch or a Hall sensor, or a rotary encoder. Depending on the field of application of the switching means on the locking mechanism or on the closing device, different sensors can be advantageous, for example a switching means on a locking part, such as a locking pawl, providing reliable detection of the locking pawl position. A rotary encoder can be used, for example, to detect the pivoting movement of the rotary latch but also to determine a force occurring in the closing device.

In a further embodiment variant of the invention, there is an advantage if a switching threshold is determinable in accordance with the setpoint value curve. A switching threshold is so far removed from the setpoint value curve or the setpoint range of the measurement variable that a clear signal can be provided to interrupt the closing operation. A switching threshold can be achieved, for example, by falling below the engine speed of the electric drive, so that a means for detecting jamming can be provided and anti-jamming protection is available for the operator of the motor vehicle. The operational safety can thus be improved and the components of the motor vehicle lock or the closing device can be protected from damage.

BRIEF DESCRIPTION OF DRAWINGS

In the following, the invention is explained in more detail with reference to the attached drawings and diagrams in accordance with one embodiment. However, the principle applies that the embodiment does not limit the invention, but merely represents an embodiment. The features shown can be implemented individually or in combination with further features of the description.

In the drawings.

DETAILED DESCRIPTION

Figure 1:
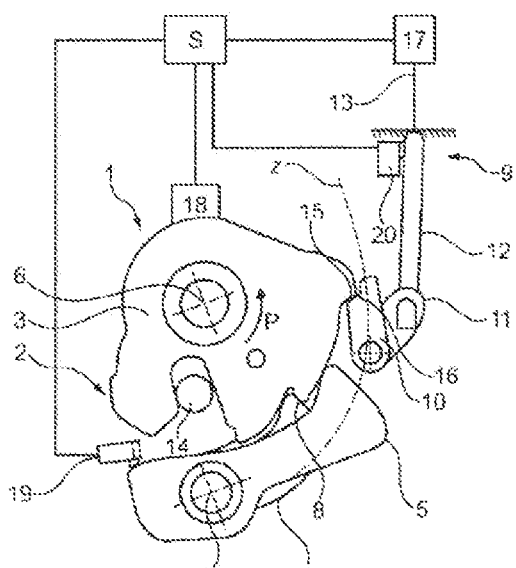
FIG. 1 is a basic representation of a part of a lock for a motor vehicle with a closing device and a locking mechanism in engagement with a lock holder, a pre-locking position of the locking mechanism being reproduced.

Part of a motor vehicle lock 1 is shown in FIG. 1. A locking mechanism 2 made up of a rotary latch 3, a pre-locking pawl 4, and a main locking pawl 5 is shown. The rotary latch is mounted pivotably about an axis 6 and the pawls 4, 5 about an axis 7. To reach a closed position, the rotary latch can be mounted so as to be pivotable about the axis 6 in the direction of the arrow P, for example in a lock plate of the motor vehicle lock 1. The pre-locking position is shown in FIG. 1, wherein the pre-locking pawl can be brought into engagement with a locking contour 8 on the rotary latch.

Also shown as part of the closing device 9 is a closing pawl 10, a receptacle 11, a pulling means 12 and a Bowden cable core 13, wherein the pulling means 12 and the Bowden cable core 13 can be part of a Bowden cable 12, 13. The closing pawl 10 is received in the motor vehicle lock such that it can pivot over a closing path Z. The closing path Z is shown as a dot-dash line and as a circular arc in FIG. 1. The lock holder 14 is also shown, wherein the lock holder 14 is already in engagement with the rotary latch in the pre-locking position.

The closing pawl 10 as well as the rotary latch 3 each have a contour 15, 16 which allows a movement of the rotary latch 3 in the direction of the arrow P and along the closing path Z. To pivot the rotary latch 3 in the direction of the arrow P, the Bowden cable core 13 is actuated by means of the electric drive 17, so that the rotary latch 3 can be transferred from a pre-locking position into a main locking position. FIG. 1 shows the pre-locking position, the pre-locking pawl 4 being in engagement with the locking contour 8. By actuating the electric drive 17, the main locking pawl 5 engages with the locking contour 8.

The invention preferably relates to the closing operation of the locking mechanism from the pre-locking position into the main locking position. However, it is also conceivable that the closing drive 9 already comes into engagement with the rotary latch 3 before pre-locking, and it is also conceivable that the closing operation extends up to an overtravel position, i.e. a position beyond the main locking position. The diagrams described below illustrate, by way of example, the closing operation from a pre-locking position VR to a main locking position HR.

A switching means 18 is arranged, for example, on the rotary latch 3 and can, for example, be a microswitch that interacts with a contour on the rotary latch 3, so that, for example, an opening, locking, or overtravel position can be detected. Of course, a plurality of switching means for detecting the opening, locking, and/or overtravel position can also be arranged on the locking mechanism. For this purpose, for example, a further switching means 19 can be arranged on the main locking pawl 5 and/or a further switching means 20 can be arranged on the Bowden cable 12, 13 or pulling means 12.

Figure 2:
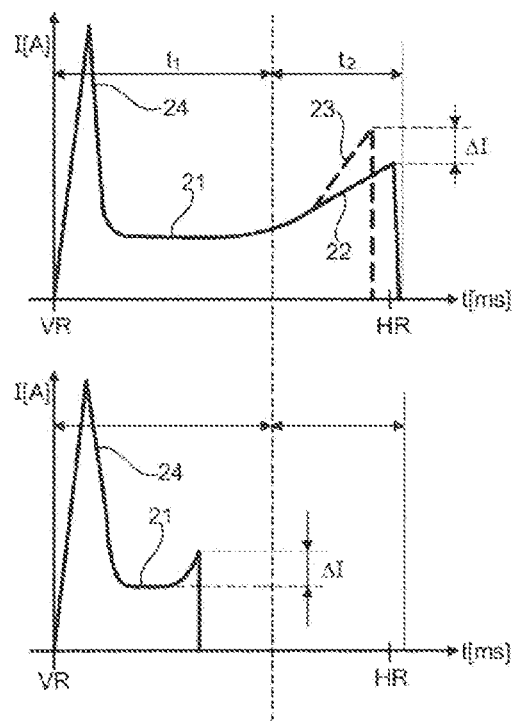
FIG. 2 is a current-time diagram with a schematically illustrated current curve during a closing operation, wherein the upper diagram also shows a current difference during the almost complete closing operation, the lower current-time diagram shows a current curve, which, with active anti-jamming protection, reproduces the current curve when jamming is detected.

FIG. 2 shows, in principle, a current curve profile of a closing operation from a pre-locking position VR to a main locking position HR. The diagram shows the course of the current consumption of the electric drive 17 over time. An ideal current curve is shown. The real values fluctuate around this ideal curve, but a tolerance window around the ideal curve is determinable. Based on a high current consumption at the beginning of the start-up of the electric drive 17, an almost linear range 21 follows in the current-time diagram with a constant current consumption of the electric drive 17. The power consumption then has an increasing range 22, the increasing range 22 being due to the fact that the electric drive 17 has to close the rotary latch 3 against the pressure of the door seal. When the main locking position HR is reached, the achievement of the main locking position HR can be detected by means of the switching means 18, 19, 20, so that the electric drive 17 can be switched off by means of the controller S. The current consumption therefore drops sharply in the diagram.

The upper diagram in FIG. 2 thus shows the ideal course of a current curve over a closing operation. If, for example, an object is jammed between a door and a door seal, the electric drive 17 moves the rotary latch 3 against the jammed object, the power consumption of the electric drive 17 increases strongly, as reproduced by the dashed range 23 in the upper diagram of FIG. 2. This excessive current consumption can be detected by means of the controller S, the controller S the controller S detecting a current difference $\Delta I$ on the basis of a stored setpoint value curve 24 in the controller, whereby a measurement variable for switching off the electric drive 17 is available. If the power consumption of the electric drive exceeds the setpoint value curve 24 or the usual fluctuation range of the power consumption of the electric drive 17 by a determinable measure $\Delta I$ of a current difference $\Delta I$, this current measure $\Delta I$ can be taken as a measure of jamming and the controller S can prevent or interrupt the closing operation. The current can be switched off, as shown by the dashed line in the upper diagram of FIG. 2. However, it is also conceivable that a reversing of the electric drive 17 is initiated so that the closing device 9 releases the rotary latch 3 again.

Figure 3:
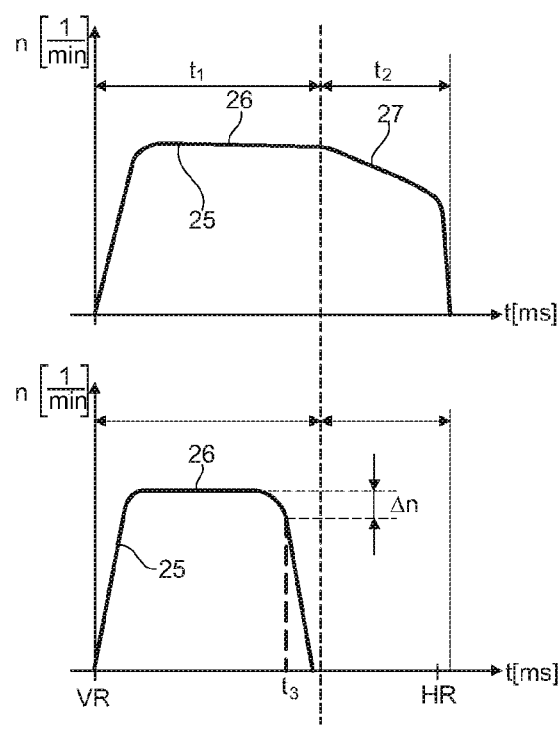
FIG. 3 is a speed-time diagram in the upper diagram with a representation of a speed curve during a normal closing operation and, in the lower diagram, is the representation of an interrupted closing operation after jamming has been detected, wherein the ascertainable speed difference for switching off the electric drive was also drawn in the lower diagram.

In addition, a point in time $t_1$ is entered as a dashed line in FIG. 3. The point in time $t_1$ is a determinable time in which an anti-jamming protection is switched on, whereas during a period $t_2$ the anti-jamming protection can be switched off. This can be particularly advantageous if, for example, large forces are required to close the locking mechanism 1, so that large current differences in the period $t_2$ occur. In particular, for example, a door that is closed can also be in a position that is already closed during the time period $t_2$ to such an extent that jamming is no longer possible for an operator. These are, for example, door gaps of less than 3 millimeters.

In the lower diagram of FIG. 2, an idealized current curve is again shown. The current curve profile corresponds to the current curve profile that occurs when jamming is detected during the closing process. In particular in the linear range 21 of the closing operation, there is a strong current difference ΔI, which is recognized by the controller S as a deviation from the setpoint value curve 24, so that the electric drive 17 can be switched off. The aforementioned monitoring of the power consumption of the electric drive 17 thus forms a reliable means for detecting jamming, as a result of which a maximum of safety can be provided during the closing operation.

In FIG. 3, the engine speed n is shown over the time t. An idealized setpoint value curve 25 is shown again. In this case, too, there can of course be a scatter range or fluctuations around the setpoint value curve 25, which the controller S recognizes in a tolerable manner within a tolerance range. The speed n increases at the beginning of the closing operation, which in turn is followed by a linear range 26. The speed then drops in a decreasing range 27, which is due to the resistance of a door or flap seal. In this ideal course of the speed n of the electric drive 17, a period $t_1$ is again entered, at which an anti-jamming protection can be present. In other words, the anti-jamming protection is switched on during the period $t_1$, whereas in the period $t_2$ there can be no anti-jamming protection.

The case of jamming is shown in the lower diagram of FIG. 3. After an increase in the speed, the linear range 26 of the speed curve 25 follows, wherein the speed dropping by a speed difference Δn is entered, which can again be detected by the controller as exceeding a tolerance level, so that the closing operation is interrupted at a point in time $t_3$.

Figure 4:
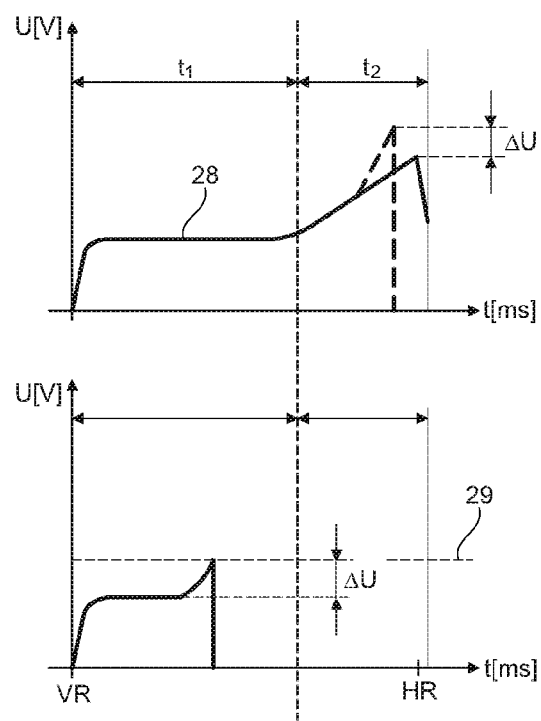
FIG. 4 shows a voltage-time curve as a diagram in a conventional closing operation, the voltage curve of a spring Hall sensor being reproduced in the form of an evaluation of the voltage curve. In addition, the upper diagram shows a voltage curve or a differential voltage which detects jamming and causes a reversing or switching off of the motor and the lower diagram shows a voltage curve of a spring Hall sensor upon detection of jamming in the case of an activated anti-jamming protection, wherein the voltage difference is also shown graphically.

FIG. 4 shows the course of a voltage over time and again over the period from a pre-locking position to a main locking position. Such a voltage signal can be detectable, for example, by a Hall sensor 20 on a pulling means 12. To achieve a voltage signal, reference is hereby made to DE 10 2017 101 704.6 by way of example, which is hereby fully explained as part of the disclosure content of the application. In this case, too, there is again a setpoint value curve 28 as an ideal voltage curve, the ideal voltage curve being stored in the controller. The storage of the setpoint value curves 24, 25, 28 is determinable for example when the sensors or the drives 17 are calibrated.

If it moves from the pre-locking position VR into the main locking position HR during the closing operation, a voltage difference Δu can again be detected in this case, which in turn represents a measure of jamming during the closing operation. If the voltage difference ΔU is too large, the controller S can cancel the closing operation and, for example, initiate reversing of the electric drive 17. The switching threshold 29, at which a switching off of the closing operation can be initiated, is determinable in accordance with the by means of a calibration, i.e. a measurement of the control curve 24, 25, 28 and/or the electric drive 17, and can be present in a stored manner as a comparison variable in the controller S.

LIST OF REFERENCE SIGNS

1 Motor vehicle lock
2 Locking mechanism
3 Rotary latch
4 Pre-locking pawl
5 Main locking pawl
6, 7 Axis
8 Locking contour
9 Closing device
10 Closing latch
11 Receptacle
12 Pulling means
13 Bowden cable core
14 Lock holder
15 Rotary latch contour
16 Closing pawl contour
17 Electric drive
18, 19, 20 Switching means
21, 26 Linear range
22 Increasing range
23 Dashed range
24, 25, 28 Setpoint value curve
27 Decreasing range
29 Switching threshold
P Arrow
VR Pre-locking position
HR Main locking position
ΔI Current difference
Δn Speed difference
ΔU Voltage difference
S Controller
t, $t_1$, $t_2$, $t_3$ Time, point in time
n Rotational speed

The invention claimed is:

1. A lock for a motor vehicle, the lock comprising:
   a locking mechanism including a rotary latch and at least one pawl,
   a closing device having an electric drive, wherein the locking mechanism is configured to be transferred from an opening state into a main locking state by the closing device, and
   a control unit for the closing device, wherein the control unit is configured to operate the closing device to prevent a closing operation of the closing device based on a measurement variable of the closing device, wherein the control unit is configured to operate the closing device to prevent the closing operation in response to a detection by the control unit of a threshold deviation of the measurement variable relative to a setpoint value curve of an expected performance of the measurement variable of the closing device;
   wherein the setpoint value curve corresponds to a calibration of the lock for the measurement variable in relation to actual loads when using the lock.

2. The lock according to claim 1, wherein the setpoint value curve corresponds to a setpoint value curve for a speed or a power consumption of the electric drive, the setpoint value curve being stored in the control unit.

3. The lock according to claim 1, wherein the closing device has a drive member and an abutment, and a drive member sensor, whereby via the drive member sensor, an application of force to the drive member is detected.

4. The lock according to claim 1, wherein the threshold deviation includes a current difference or a speed difference or a voltage difference as a deviation from the setpoint value curve.

5. The lock according to claim 1 further comprising a rotary latch sensor configured to determine a closed position of the rotary latch.

6. The lock according to claim 5, wherein the control unit is configured to activate or deactivate preventing of the closing operation based on a signal from the rotary latch sensor.

7. The lock according to claim 1, wherein the closing device is configured for a reversing operation or a switching off of a power supply to the closing device during a detection of a current or speed or voltage difference as the threshold deviation from the setpoint value curve.

8. The lock according to claim 1 further comprising at least one sensor for determining the opening state and/or a pre-locking state and/or the main locking state, and/or an overtravel state of the locking mechanism.

9. The lock according to claim 8, wherein the at least one sensor is a microswitch or a Hall sensor.

10. The lock according to claim 1, wherein the control unit is configured to store a switching threshold at which a switching off of the closing operation is initiated, the switching threshold being determined based on the setpoint value curve.

11. The lock according to claim 3, wherein the drive member is a Bowden cable.

12. The lock according to claim 3, wherein the drive member sensor is configured to detect voltage.

13. The lock according to claim 1, wherein the threshold deviation corresponds to a voltage difference corresponding to jamming of the locking mechanism during the closing operation, wherein when the voltage difference exceeds a predetermined value, the control unit is configured to initiate a reversing operation of the electric drive.

14. The lock according to claim 1, wherein the at least one pawl includes a pre-locking pawl and a main locking pawl, and wherein the locking mechanism is movable from a pre-locking state into the main locking state during the closing operation.

15. The lock according to claim 8, wherein the at least one sensor is in communication with the control unit, wherein the control unit is configured to switch off the electric drive when the main locking state of the locking mechanism is detected by the at least one sensor.

16. The lock according to claim 4, wherein the control unit is configured to determine the current difference that corresponds to power consumption of the electric drive that is dependent on jamming of the locking mechanism.

17. The lock according to claim 1, wherein the measurement variable of the closing device includes at least one of a power consumption of the electric drive, a speed of the electric drive, or a voltage curve.

18. The lock according to claim 6, wherein preventing of the closing operation is activated during an initial time period and deactivated during a second time period in which the detection of the threshold deviation corresponds to at least one of an increase in current or a decrease in speed of the electric drive.

19. The lock according to claim 1, wherein the setpoint value curve is stored in the control unit.

* * * * *